(12) United States Patent
Fournier et al.

(10) Patent No.: US 8,219,276 B2
(45) Date of Patent: Jul. 10, 2012

(54) METHOD AND DEVICE FOR AIDING THE MAINTENANCE OF A SYSTEM

(75) Inventors: Francois Fournier, Roques/sur/Garonne (FR); Christian Sannino, Muret (FR); Carine Bailly, Tournefeuille (FR)

(73) Assignee: Thales, Neuilly sur Seine (FR)

( * ) Notice: Subject to any disclaimer, the term of this patent is extended or adjusted under 35 U.S.C. 154(b) by 490 days.

(21) Appl. No.: 12/437,166

(22) Filed: May 7, 2009

(65) Prior Publication Data
US 2009/0306838 A1 Dec. 10, 2009

(30) Foreign Application Priority Data
May 13, 2008 (FR) ...................................... 08 02591

(51) Int. Cl.
*G01M 17/00* (2006.01)
(52) U.S. Cl. .......... 701/29.1; 701/3; 701/30.2; 702/184; 705/7.13
(58) Field of Classification Search .................... 701/29, 701/33; 514/252.18, 275; 544/35, 122, 330–332; 382/218
See application file for complete search history.

(56) References Cited

U.S. PATENT DOCUMENTS

| | | | |
|---|---|---|---|
| 7,362,699 | B1 | 4/2008 | Bernas et al. |
| 2006/0155425 | A1 | 7/2006 | Howlett et al. |
| 2008/0129459 | A1 | 6/2008 | Bailly et al. |
| 2008/0147740 | A1 | 6/2008 | Bailly et al. |
| 2008/0215194 | A1 | 9/2008 | Bailly et al. |
| 2008/0249678 | A1 | 10/2008 | Bailly et al. |
| 2008/0304417 | A1 | 12/2008 | Liu et al. |
| 2010/0017241 | A1* | 1/2010 | Lienhardt ........................ 705/8 |

FOREIGN PATENT DOCUMENTS

| | | |
|---|---|---|
| EP | 1069487 A | 1/2001 |
| EP | 1236986 A | 9/2002 |

OTHER PUBLICATIONS

Heckerman, et al.: "Decision-Theroretic" communications of the Association for computing Machinery, ACM, New York, NY, US, vol. 38, No. 3, Mar. 3, 1995, pp. 49-57.

* cited by examiner

*Primary Examiner* — Thomas G Black
*Assistant Examiner* — Luke Huynh
(74) *Attorney, Agent, or Firm* — Stroock & Stroock & Lavan LLP

(57) ABSTRACT

The invention relates to a method for aiding the maintenance of a system, the system comprising a set of networked elements, the system being accompanied by indications defining subsets of networked elements $E_i$, each subset of networked elements $E_i$ being associated with a probability of failure $P_i$, the including the steps of calculating a first value $T_i$ for each subset of networked elements $E_i$, the first value $T_i$ including an estimation of the maintenance time related to the repair of the subset of networked elements $E_i$, calculating a second value $F_i$ for each subset of networked elements $E_i$, the second value $F_i$ including a representation of a compromise between the estimation of the maintenance time $T_i$ related to the repair of the subset of networked elements $E_i$ and the probability of failure $P_i$ of the subsets of networked elements $E_i$, and sorting the designated sets of items of equipment $E_i$ in order of decreasing second value $F_i$.

16 Claims, 2 Drawing Sheets

METHOD AND DEVICE FOR AIDING THE MAINTENANCE OF A SYSTEM

CROSS-REFERENCE TO RELATED APPLICATION

The present application claims the benefit of French Application No. 08 02591, filed on May 13, 2008, which hereby is incorporated by reference in its entirety.

TECHNICAL FIELD

The invention relates to the maintenance of a set of items of equipment, such as the set of avionics equipment, situated in the cabin or on the passenger side of a civilian or military aircraft, which fulfil for example the various functions necessary for accomplishing a flight.

BACKGROUND OF THE INVENTION

These items of equipment communicate with one another and with the environment through a physical network. This communication network associated with a set of items of equipment is known by the name ADCN, derived from the expression "Airborne Data Communication Network".

Fault location is based on a reliable diagnosis of all or some of this set of equipment. Such a diagnosis must take into account the topology of this set and alterations therein. The diagnosis must also take into account the interactions between different systems and in particular the nature of the physical components of the ADCN (discrete, ARINC 429, multiplexed, wireless, etc.). Within the framework of an avionics series, this maintenance system can be either the centralized maintenance system of CFDIU (Central Fault Display Interface Unit) or CMF (Central Maintenance Function) type, or a BITE (Built In Test) at system, resource or even application package level, or a system independent of the system to be maintained, for example, a ground maintenance system for maintaining an aeroplane.

Most of the current maintenance systems include a fault location function. Such a function makes it possible, on the basis of a fault message emitted, to designate one or more sets of elements of the system as being potentially faulty. If several sets of elements are designated, they are then ordered in order of decreasing probability of failure. A drawback of such a system is that no account is taken of the operational constraints of the maintenance operators.

To solve this problem, the method described in patent application US2004/0034456 makes it possible to multiply this fault occurrence probability with the maintenance cost associated with the repair of the elements considered. This system has the drawback of depending on the economic model of the airline and therefore is not intrinsic to the use of the aeroplane. This method does not address the operator's problem which is "to repair the set of elements in as short a time as possible".

In particular, the objective of a maintenance operator is to minimize the time related to this return to service and maintenance in general. The indications provided by this method can lead a maintenance operator to prefer a repair of an item of equipment which is expensive time-wise but not very costly to a repair of another item of equipment which is more expensive for the airline but whose implementation is much faster.

SUMMARY OF THE INVENTION

For this purpose, the subject of the invention is a method for aiding the maintenance of a system, the said system having a set of elements, the said elements being networked, the said system being accompanied by indications defining subsets of elements $E_i$, each subset of elements $E_i$ being associated with a probability of failure $P_i$, wherein the said method includes the following steps:

the calculation of a first value $T_i$ for each subset of elements $E_i$, the said first value $T_i$ being an estimation of the maintenance time related to the repair of the said subset of elements $E_i$, the calculation of a second value $F_i$ for each subset of elements $E_i$, the said second value $F_i$ being a representation of a compromise between the estimation of the maintenance time $T_i$ related to the repair of the said subset of elements $E_i$ and the probability of failure $P_i$ of the said subsets of elements $E_i$, the sorting of the designated sets of items of equipment $E_i$ in order of decreasing second value $F_i$.

Embodiments of the invention have the advantage of effecting a link between the fault location functions according to the known art and the objectives of a maintenance operator. Specifically, the maintenance operator's job is to return the equipment of an aeroplane to service, but his objective is to minimize the time related to this return to service and to maintenance in general. The method for aiding maintenance according to an embodiment of the invention takes into account at one and the same time the probability of failure of the various elements of the system and the time related to the repair of these elements. The method according to an embodiment of the invention allows a maintenance operator to prefer the repair of the elements exhibiting the best relationship between their probability of failure and their repair time.

According to a characteristic of an embodiment of the invention, the calculation of the first value $T_i$ of a subset of elements $E_i$ includes the calculation of a repair time $TR_i$ of the subset of elements $E_i$, the said repair time $TR_i$ being defined as the sum of a dismantling time, of a local diagnosis time, of a repair time and of a return-to-service time.

According to a characteristic of an embodiment of the invention, the calculation of the first value $T_i$ of a subset of elements $E_i$ includes, furthermore, the calculation of an overall repair time $TGR_i$, the said overall repair time $TGR_i$ being defined as the sum of a maintenance personnel diagnosis time, of a logistic time, of the repair time $TR_i$ and of a time to report to the flight personnel.

According to a characteristic of an embodiment of the invention, the calculation of the first value $T_i$ of a subset of elements $E_i$ includes, furthermore, the calculation of an unavailability time of the aeroplane, the said unavailability time of the aeroplane being defined as the sum of a time of investigation of the flight personnel leading to the intervention of the maintenance personnel, of the overall repair time $TGR_i$, of a time for obtaining a start authorization, of a passenger disembarkation/embarkation time, of a time for making a new aeroplane available and of a time for accommodating the passengers before the new aeroplane is made available.

According to a characteristic of an embodiment of the invention, the second value $F_i$ corresponding to a subset of elements $E_i$ is a ratio between the probability of failure of the subset of elements $E_i$ and the first value $T_i$ calculated for the subset of elements $E_i$.

According to a characteristic of an embodiment of the invention, the sorting step orders the designated sets of items of equipment $E_i$ exhibiting an identical value $F_i$ in order of increasing first value $T_i$.

The subject of an embodiment of the invention is also a device implementing the method according to the invention.

The subject of an embodiment of the invention is also a maintenance system including the device according to an embodiment of the invention.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION OF THE INVENTION

Figure 1:
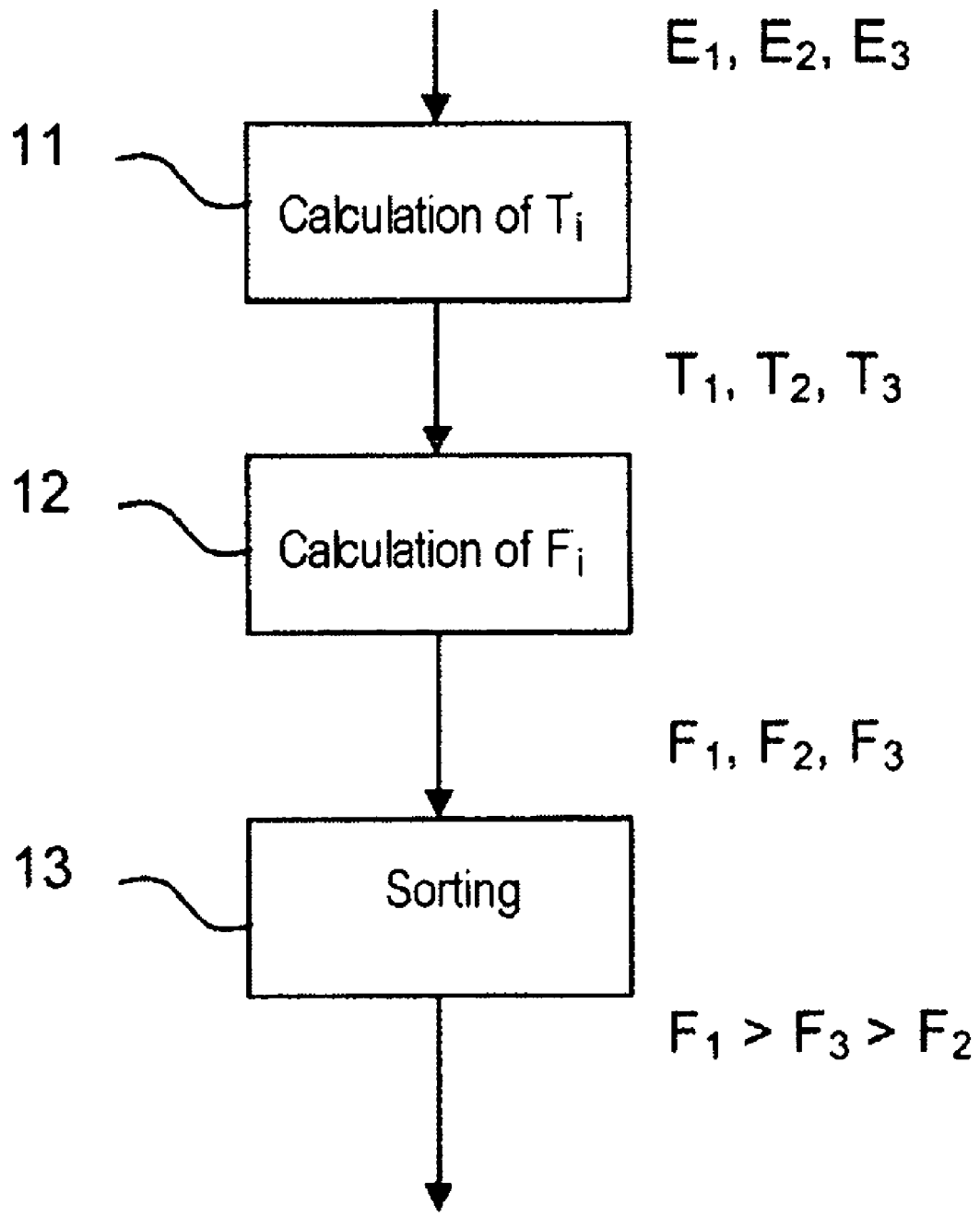
FIG. 1 represents a flowchart describing an exemplary application of the method according to an embodiment of the invention.

An embodiment of the invention relates to a method for aiding the maintenance of a system, the said system including a set of elements. The elements are networked. The system is accompanied by indications defining subsets of elements $E_i$, each subset of elements being associated with a probability of failure $P_i$. The elements are items of equipment (LRU type including switch) or physical links that have developed faults. An LRU (acronym of the expression Line Replaceable Unit) is either an item of equipment in the broad sense or a physical link (cable). But it is also possible to consider any set of items of equipment, any set of cards of an item of equipment, any set of functional blocks of a card or any set of components of a functional block FIG. 1 represents a flowchart describing an exemplary application of the method according to an embodiment of the invention. The method according to an embodiment of the invention includes the following steps:

The first step of the method is the calculation 11 of a first value $T_i$ for each subset of elements $E_i$. The first value $T_i$ is an estimation of the maintenance time related to the repair of the said subset of elements $E_i$. It is assumed in the example that a fault location device, for example, has established a diagnosis in the form of three sets of elements $E_1$, $E_2$ and $E_3$ as being potentially faulty. The three sets of elements are defined as follows:

$E_1$ includes an element $A_1$
$E_2$ includes elements $A_2$ and $A_3$
$E_3$ includes elements $A_4$ and $A_5$ and $A_6$
where $A_1, A_2, A_3, A_4, A_5$ and $A_6$ are LRUs or parts of LRUs. This diagnosis is interpreted in the following manner: the fault therefore lies either in $A_1$, or simultaneously on $A_2$ and $A_3$, or simultaneously on $A_4$, $A_5$ and $A_6$. By using a mathematical notation, the diagnosis is $D=A_1+A_2.A_3+A_4.A_5.A_6$ ("+" signifies "or" and "." signifies "and").

Moreover, the diagnosis device orders this list from "the most probably faulty" elements to the "less probably faulty" elements. For this purpose, it associates with each LRU its probability of occurrence of a fault (or failure) $P(A_i)$.

In the example above, if $P(A_1)>P(A_4.A_5.A_6)>P(A_2.A_3)$, then the result of the diagnosis is:

$A_1$
$A_4$ and $A_5$ and $A_6$
$A_2$ and $A_3$

According to a characteristic of an embodiment of the invention, the calculation 11 of the first value $T_i$ of a subset of elements $E_i$ includes the calculation of a repair time $TR_i$ for the subset of elements $E_i$, the said repair time $TR_i$ being defined as the sum of a dismantling time, of a local diagnosis time, of a repair time and of a return-to-service time. In the example, the following are calculated:

$$T_1 = \text{time\_to\_dismantle}(A_1) + \text{time\_for\_local\_diagnosis}(A_1) + \text{time\_to\_repair}(A_1) + \text{return\_to\_service\_time}(A_1).$$

$$T_2 = \text{time\_to\_dismantle}(A_2.A_3) + \text{time\_for\_local\_diagnosis}(A_2.A_3) + \text{time\_to\_repair}(A_2.A_3) + \text{return\_to\_service\_time}(A_2.A_3).$$

$$T_3 = \text{time\_to\_dismantle}(A_4.A_5.A_6) + \text{time\_for\_local\_diagnosis}(A_4.A_5.A_6) + \text{time\_to\_repair}(A_4.A_5.A_6) + \text{return\_to\_service\_time}(A_4.A_5.A_6).$$

For the sets E2 and E3 which group together several simultaneously faulty items of equipment, it is necessary to define more precisely the concepts of dismantling time, local diagnosis time, repair time and return-to-service time. We define the following rules within the framework of the example. Other rules can be used to estimate these various times.

The element dismantling times are aggregated, conveying the fact that the elements are dismantled one after another. Thus the dismantling time for a set of elements is equal to the sum of the dismantling time for each of these elements, for example: time_to_dismantle $(A_2.A_3)$=time_to_dismantle $(A_2)$+time_to_dismantle $(A_3)$.

The same holds for the repair times and the local diagnosis times, for example: time_to_repair $(A_2.A_3)$=time_to_repair $(A_2)$+time_to_repair $(A_3)$.

The element return-to-service times are not aggregated, conveying the fact that the elements can be returned to service in parallel. The return-to-service time for a set of elements is then equal to the maximum return-to-service time for these elements, for example: return_to_service_time$(A_2.A_3)$=max (return_to_service_time$(A_2)$, return_to_service_time$(A_3)$)

For example, a simple change of computer can take from twenty minutes to several hours and the replacement of a probe can be several days.

The second step of the method is the calculation 12 of a second value $F_i$ for each subset of elements $E_i$. The second value $F_i$ is a representation of a compromise between the estimation of the maintenance time $T_i$ related to the repair of the said subset of elements $E_i$ and the probability of failure $P_i$ of the said subsets of elements $E_i$.

According to a characteristic of an embodiment of the invention, the second value $F_i$ corresponding to a subset of elements $E_i$ is a ratio between the probability of failure of the subset of elements $E_i$ and the first value $T_i$ calculated for the subset of elements $E_i$.

In the example, the following are calculated:

$$F_1 = P(A_1)/T_1$$

$$F_2 = P(A_2.A_3)/T_2$$

$$F_3 = P(A_4.A_5.A_6)/T_3$$

To calculate the probability of failure of an item of equipment A, for example, we take: $P(A)=T/MTBF$ with T being its exposure time: 3 hours the flight time for example (the exposure time corresponds to the time between the last moment at which an anomaly detection mechanism has detected nothing and the instant at which it has detected an anomaly and dispatched a fault message), and MTBF (acronym of the expression Mean Time Between Failure), MTBF=50000 h for example.

The third step of the method is the sorting 13 of the designated sets of items of equipment $E_i$ in order of decreasing value $F_i$. In our example, it is assumed that $F_1>F_3>F_2$.

According to a characteristic of an embodiment of the invention, the calculation 11 of the first value $T_i$ of a subset of elements $E_i$ includes, furthermore, the calculation of an overall repair time $TGR_i$, the said overall repair time $TGR_i$ being defined as the sum of a maintenance personnel diagnosis time, of a logistic time (documents, equipment, facilities), of the repair time $TR_i$ and of a time to report to the flight personnel.

According to a characteristic of an embodiment of the invention, the calculation 11 of the first value $T_i$ of a subset of elements $E_i$ includes, furthermore, the calculation of an unavailability time of the aeroplane, the said unavailability time of the aeroplane being defined as the sum of a time of investigation of the flight personnel leading to the intervention of the maintenance personnel, of the overall repair time $TGR_i$, of a time for obtaining a start authorization, of a passenger disembarkation/embarkation time, of a time for making a new aeroplane available and of a time for accommodating the passengers before the new aeroplane is made available.

According to a characteristic of an embodiment of the invention, the sorting step 13 orders the designated sets of items of equipment $E_i$ exhibiting identical values $F_i$ in order of increasing first value $T_i$. Thus if two designated sets of items of equipment $E_i$ exhibit identical values $F_i$, it will be preferred to repair first that one of the two exhibiting the shortest repair time.

Figure 2:
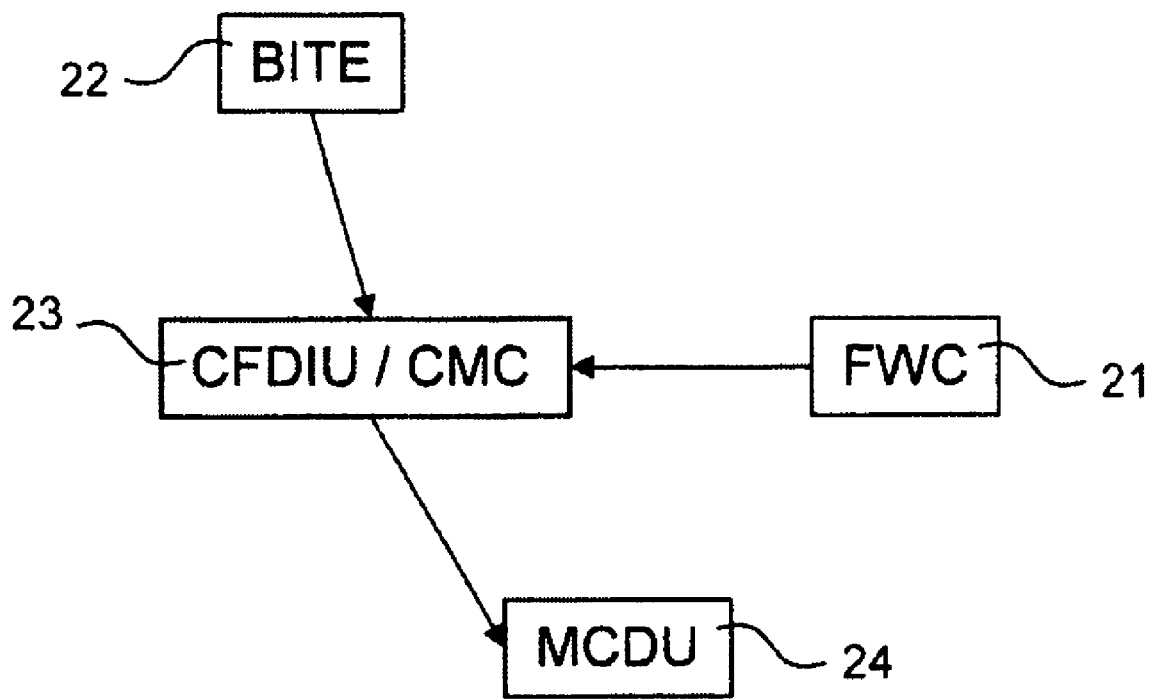
FIG. 2 represents an exemplary implementation of the device according to an embodiment of the invention in a maintenance system.

FIG. 2 represents an exemplary implementation of the device according to an embodiment of the invention in a maintenance system.

The maintenance system includes:
- a monitoring and alarm function 21 making it possible to detect a malfunction having an impact on the safety of the aircraft and called a "Flight Warning";
- a monitoring function 22 for diagnosing the faults and storing them, known by the name BITE function, derived from the abbreviation of the expression "Built In Test Equipment". This function monitors for example: the contravention of standards by the monitored parameters, the results of the tests, the diagnosis of a fault when one exists, as well as the fault messages emitted. The fault messages of the BITE functions of the monitored equipment of an aircraft are addressed, by an aircraft data transmission link, to a centralizing item of equipment placed aboard the aircraft so as to marshal the various fault messages emitted.
- a specialized central computer 23 known by various titles such as CMC from the expression "Central Maintenance Computer" or else CFDIU from the expression "Centralised Fault Display Interface Unit", making it possible to process the fault messages originating from the BITE functions of the various items of equipment.

This central maintenance computer 23 is accessible to the crew through an interface with keyboard and screen which may be that known by the abbreviation MCDU 24 derived from the expression "Multipurpose Control Display Unit". The device according to an embodiment of the invention may be integrated for example into the central maintenance computer 23.

The method according to an embodiment of the invention can be implemented either in the centralized maintenance system CFDIU (Central Fault Display Interface Unit) or CMF (Central Maintenance Function), or in a BITE (Built In Test) at system, resource or even application package level, or in a system independent of the system to be maintained (for example a ground maintenance system for maintaining an aeroplane).

The invention claimed is:

1. A method to aid in maintaining a system, the method being implemented by a maintenance computer, the system comprising a set of networked elements, said networked elements comprising physical items including at least one of equipment and links, the system being configured into one or more subsets of networked elements $E_i$, each of said one or more subsets of networked elements $E_i$ being associated with a probability of failure $P_i$, wherein the method comprises the steps of:
   calculating a first value $T_i$ for each of said one or more subsets of networked elements $E_i$, the first value $T_i$ comprising an estimation of a maintenance time related to a repair of said one or more subsets of networked elements $E_i$;
   calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$, wherein $F_i$ is a ratio between the probablility of failure of the subset of networked elements $E_i$ and the first value $T_i$ calculated for the subset of networked elements $E_i$; and
   sorting said one or more subsets of networked elements $E_i$ in order of decreasing second value $F_i$.

2. The method according to claim 1, wherein the calculation of the first value $T_i$ of a subset of networked elements $E_i$ comprises a calculation of a repair time $TR_i$ for the subset of networked elements $E_i$, the repair time $TR_i$ comprising a sum of a dismantling time, a local diagnosis time, a repair time and a return-to-service time.

3. The method according to claim 2, wherein the method is used to maintain an airplane, and wherein the calculation of the first value $T_i$ of a subset of networked elements $E_i$ comprises a calculation of an overall repair time $TGR_i$, the overall repair time $TGR_i$ comprising a sum of a maintenance personnel diagnosis time, a logistic time, the repair time $TR_i$ and a time to report to a member of flight personnel of the airplane.

4. A method to aid in maintaining a system, the method being implemented by a maintenance computer, the system comprising a set of networked elements, said networked elements comprising physical items including at least one of equipment and links, the system being configured into one or more subsets of networked elements $E_i$, each of said one or more subsets of networked elements $E_i$ being associated with a probability of failure $P_i$, wherein the method comprises the steps of:
   calculating a first value $T_1$ for each of said one or more subsets of networked elements $E_i$, the first value $T_i$, comprising an estimation of a maintenance time related to a repair of said one or more subsets of networked elements $E_i$;
   calculating a second value $F_1$ for each of said one or more subsets of networked elements $E_i$, the second value $F_i$, calculated as a function of the estimation of the maintenance time $T_i$ related to the repair of said one or more subsets of networked elements $E_i$ and the probability of failure $P_i$ of said one or more subsets of networked elements $E_i$; and
   sorting said one or more subsets of networked elements $E_i$ in order of decreasing second value $F_i$,
   wherein the calculation of the first value $T_i$ of a subset of networked elements $E_i$ comprises a calculation of a repair time $TR_i$ for the subset of networked elements $E_1$, the repair time $TR_i$ comprising a sum of a dismantling time, a local diagnosis time, a repair time and a return-to-service time; and wherein the method is used to maintain an airplane, and the calculation of the first value $T_i$ of a subset of networked elements $E_i$ comprises a calculation of an overall repair time $TGR_i$, the overall repair time $TGR_i$ comprising a sum of a maintenance personnel diagnosis time, a logistic time, the repair time $TR_i$ and a time to report to a member of flight personnel of the airplane; and wherein the calculation of the first value $T_i$ of a subset of networked elements $E_i$ comprises a calculation of an unavailability time of the airplane, the unavailability time of the airplane comprising a sum of a time of investigation of the flight personnel leading to intervention by maintenance personnel, the overall repair time $TGR_i$, a time to obtain a start authorization, a passenger disembarkation/embarkation time, a time to make a new airplane available and a time to accommodate passengers before the new airplane is made available.

5. The method according to claim 4, wherein the second value $F_i$ corresponding to a subset of networked elements $E_i$ is a ratio between the probability of failure of the subset of networked elements $E_i$ and the first value $T_i$ calculated for the subset of networked elements $E_i$.

6. A method to aid in maintaining a system, the method being implemented by a maintenance computer, the system comprising a set of networked elements, said networked elements comprising physical items including at least one of equipment and links, the system being configured into one or more subsets of networked elements $E_i$, each of said one or more subsets of networked elements $E_i$ being associated with a probability of failure $P_i$, wherein the method comprises the steps of:

calculating a first value $T_i$ for each of said one or more subsets of networked elements $E_i$, the first value $T_i$ comprising an estimation of a maintenance time related to a repair of said one or more subsets of networked elements $E_i$;

calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$; and sorting said one or more subsets of networked elements $E_i$ in order of decreasing second value $F_i$ wherein the step of sorting subsets sorts designated sets of items of equipment $E_i$ having identical values $F_i$ in order of increasing first value $T_i$.

7. A device to aid the maintenance of a system comprising a set of networked elements, the networked elements comprising physical items of at least one of equipment and links, wherein the device implements a method comprising the steps of:

calculating a first value $T_i$ for each of said one or more subsets of networked elements $E_i$, the first value $T_i$ comprising an estimation of a maintenance time related to a repair of the of said one or more subsets of networked elements $E_i$;

calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$; and sorting said one or more subsets of networked elements $E_i$ in order of decreasing second value $F_i$;

wherein the calculation of the first value $T_i$ of a subset of networked elements $E_i$ comprises a calculation of a repair time $TR_i$ for the subset of networked elements $E_i$, the repair time $TR_i$ comprising a sum of a dismantling time, a local diagnosis time, a repair time and a return-to-service time;

wherein the device is used to maintain an airplane, and wherein the calculation of the first value $T_i$ of a subset of networked elements $E_i$ comprises a calculation of an overall repair time $TGR_i$, the overall repair time $TGR_i$ comprising a sum of a maintenance personnel diagnosis time, a logistic time, the repair time $TR_i$ and a time to report to a member of flight personnel of the airplane;

wherein the calculation of the first value $T_i$ of a subset of networked elements $E_i$ comprises a calculation of an unavailability time of the airplane, the unavailability time of the airplane comprising a sum of a time of investigation of the flight personnel leading to intervention by maintenance personnel, the overall repair time $TGR_i$, a time to obtain a start authorization, a passenger disembarkation/embarkation time, a time to make a new airplane available and a time to accommodate passengers before the new airplane is made available.

8. A system to maintain a set of networked elements, the networked elements comprising physical items including at least one of equipment and links, the system comprising:

a maintenance computer to process fault messages originating from items of equipment, wherein the maintenance computer implements a method comprising the steps of:

calculating a first value $T_i$ for each of said one or more subsets of networked elements $E_i$, the first value $T_i$ comprising an estimation of a maintenance time related to a repair of the of said one or more subsets of networked elements $E_i$;

calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$; and sorting said one or more subsets of networked elements $E_i$ in order of decreasing second value $F_i$;

wherein the calculation of the first value $T_i$ of a subset of networked elements $E_i$ comprises a calculation of a repair time $TR_i$ for the subset of networked elements $E_i$, the repair time $TR_i$ comprising a sum of a dismantling time, a local diagnosis time, a repair time and a return-to-service time;

wherein the system is used to maintain an airplane, and wherein the calculation of the first value $T_i$ of a subset of networked elements $E_i$ comprises a calculation of an overall repair time $TGR_i$, the overall repair time $TGR_i$ comprising a sum of a maintenance personnel diagnosis time, a logistic time, the repair time $TR_i$ and a time to report to a member of flight personnel of the airplane;

wherein the calculation of the first value $T_i$ of a subset of networked elements $E_i$ comprises a calculation of an unavailability time of the airplane, the unavailability time of the airplane comprising a sum of a time of investigation of the flight personnel leading to intervention by maintenance personnel, the overall repair time $TGR_i$, a time to obtain a start authorization, a passenger disembarkation/embarkation time, a time to make a new airplane available and a time to accommodate passengers before the new airplane is made available.

9. The method according to claim 6, wherein the calculation of the first value $T_i$ of a subset of networked elements $E_i$ comprises a calculation of a repair time $TR_i$ for the subset of networked elements $E_i$, the repair time $TR_i$ comprising a sum of a dismantling time, a local diagnosis time, a repair time and a return-to-service time.

10. The method according to claim 9, wherein the method is used to maintain an airplane, and wherein the calculation of the first value $T_i$ of a subset of networked elements $E_i$ comprises a calculation of an overall repair time $TGR_i$, the overall repair time $TGR_i$ comprising a sum of a maintenance personnel diagnosis time, a logistic time, the repair time $TR_i$ and a time to report to a member of flight personnel of the airplane.

11. The method according to claim 10, wherein the calculation of the first value $T_i$ of a subset of networked elements $E$; comprises a calculation of an unavailability time of the airplane, the unavailability time of the airplane comprising a sum of a time of investigation of the flight personnel leading to intervention by maintenance personnel, the overall repair time $TGR_i$, a time to obtain a start authorization, a passenger disembarkation/embarkation time, a time to make a new airplane available and a time to accommodate passengers before the new airplane is made available.

12. The method according to claim 6, wherein the second value $F_i$ corresponding to a subset of networked elements $E_i$ is a ratio between the probability of failure of the subset of networked elements $E_i$ and the first value $T_i$ calculated for the subset of networked elements $E_i$.

13. A device to aid the maintenance of a system comprising a set of networked elements, the networked elements comprising physical items of at least one of equipment and links, wherein the device implements a method comprising the steps of:
   calculating a first value $T_i$ for each of said one or more subsets of networked elements $E_i$, the first value $T_i$ comprising an estimation of a maintenance time related to a repair of the of said one or more subsets of networked elements $E_i$;
   calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$, wherein $F_i$ is a ratio between the probability of failure of the subset of networked elements $E_i$ and the first value $T_i$ calculated for the subset of networked elements $E_i$; and
   sorting said one or more subsets of networked elements $E_i$ in order of decreasing second value $F_i$.

14. A device to aid the maintenance of a system comprising a set of networked elements, the networked elements comprising physical items of at least one of equipment and links, wherein the device implements a method comprising the steps of:
   calculating a first value $T_i$ for each of said one or more subsets of networked elements $E_i$, the first value $T_i$ comprising an estimation of a maintenance time related to a repair of the of said one or more subsets of networked elements $E_i$;
   calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$; and
   sorting said one or more subsets of networked elements $E_i$ in order of decreasing second value $F_i$;
   wherein the step of sorting subsets sorts designated sets of items of equipment $E_i$ having identical values $F_i$ in order of increasing first value $T_i$.

15. A system to maintain a set of networked elements, the networked elements comprising physical items including at least one of equipment and links, the system comprising:
   a maintenance computer to process fault messages originating from items of equipment,
   wherein the maintenance computer implements a method comprising the steps of:
      calculating a first value $T_i$ for each of said one or more subsets of networked elements $E_i$, the first value $T_i$ comprising an estimation of a maintenance time related to a repair of the of said one or more subsets of networked elements $E_i$;
      calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$, wherein the second value $F_i$ corresponding to a subset of networked elements $E_i$ is a ratio between the probability of failure of the subset of networked elements $E_i$ and the first value $T_i$ calculated for the subset of networked elements $E_i$; and
      sorting said one or more subsets of networked elements $E_i$ in order of decreasing second value $F_i$.

16. A system to maintain a set of networked elements, the networked elements comprising physical items including at least one of equipment and links, the system comprising:
   a maintenance computer to process fault messages originating from items of equipment,
   wherein the maintenance computer implements a method comprising the steps of:
      calculating a first value $T_i$ for each of said one or more subsets of networked elements $E_i$, the first value $T_i$ comprising an estimation of a maintenance time related to a repair of the of said one or more subsets of networked elements $E_i$;
      calculating a second value $F_i$ for each of said one or more subsets of networked elements $E_i$, the second value $F_i$ calculated as a function of the estimation of the maintenance time $T_i$ related to the repair of said one or more subsets of networked elements $E_i$ and the probability of failure $P_i$ of said one or more subsets of networked elements $E_i$; and
      sorting said one or more subsets of networked elements $E_i$ in order of decreasing second value $F_i$;
      wherein the step of sorting subsets sorts designated sets of items of equipment $E_i$ having identical values $F_i$ in order of increasing first value $T_i$.

* * * * *